US009436460B2

(12) United States Patent
Bantupalli (10) Patent No.: US 9,436,460 B2
(45) Date of Patent: Sep. 6, 2016

(54) REGRESSION ALERTS

(71) Applicant: International Business Machines Corporation, Armonk, NY (US)

(72) Inventor: Sairam Bantupalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/065,831

(22) Filed: Oct. 29, 2013

(65) Prior Publication Data
US 2015/0121333 A1    Apr. 30, 2015

(51) Int. Cl.
*G06F 9/44* (2006.01)
*G06Q 10/10* (2012.01)

(52) U.S. Cl.
CPC .............. *G06F 8/71* (2013.01); *G06Q 10/101* (2013.01)

(58) Field of Classification Search
CPC .............. G06F 8/65; G06F 8/71; G06F 8/73; G06F 11/362; G06F 11/3672; G06F 11/368; G06F 11/3688; G06F 11/3684; G06F 707/99954; G06F 9/4443; G06F 11/3664
See application file for complete search history.

(56) References Cited

U.S. PATENT DOCUMENTS

| 7,100,195 | B1* | 8/2006 | Underwood .......... G06F 9/4443 |
| | | | 707/999.009 |
| 7,711,992 | B2 | 5/2010 | Coulter et al. |
| 8,117,598 | B2 | 2/2012 | Johnson et al. |
| 8,276,123 | B1 | 9/2012 | Deng et al. |
| 8,276,126 | B2 | 9/2012 | Farnham et al. |
| 8,407,670 | B2 | 3/2013 | Hegde et al. |
| 2003/0145281 | A1* | 7/2003 | Thames et al. ................ 715/513 |
| 2005/0166094 | A1* | 7/2005 | Blackwell ........... G06F 11/3664 |
| | | | 714/38.14 |
| 2005/0235012 | A1* | 10/2005 | Harry et al. ................... 707/203 |
| 2006/0236301 | A1* | 10/2006 | Minium et al. ............... 717/101 |
| 2006/0282479 | A1* | 12/2006 | Johnson et al. .............. 707/203 |
| 2010/0005341 | A1 | 1/2010 | Agarwal et al. |
| 2010/0058294 | A1* | 3/2010 | Best et al. ..................... 717/122 |
| 2010/0095276 | A1* | 4/2010 | Ottavi ................. G06F 11/3672 |
| | | | 717/125 |
| 2014/0164208 | A1* | 6/2014 | Mueller et al. .................. 705/37 |
| 2014/0282411 | A1* | 9/2014 | Liemandt et al. ............ 717/124 |
| 2014/0325480 | A1* | 10/2014 | Bhagavatula ....... G06F 11/3688 |
| | | | 717/124 |
| 2014/0344557 | A1* | 11/2014 | Bartlow et al. ............... 712/236 |
| 2014/0372983 | A1* | 12/2014 | Presley et al. ................ 717/124 |

OTHER PUBLICATIONS

Biswas, et al., "Regression Test Selection Techniques: A Survey", Informatica 35 (2011) 289-321, <http://www.cse.ohio-state.edu/~biswass/files/informaticasurvey.pdf>.

(Continued)

*Primary Examiner* — Tuan Vu
(74) *Attorney, Agent, or Firm* — Alessandra A. Suuberg (57) ABSTRACT

Embodiments of the present invention include a method, computer program product, and system for generating an alert as to a potential regression. In one embodiment, a server computer system receives an instruction from a first location to associate a first changeset with a record, wherein the first changeset has associated metadata, and associates the first changeset with the first record. The server computer system receives an instruction from a second location to modify the first changeset by merging a second changeset with the first changeset and sends an alert to the second location to indicate that merging the changeset may cause a regression.

10 Claims, 4 Drawing Sheets

(56) References Cited

OTHER PUBLICATIONS

Garg, Arun, "Finding Highly Impacted Defects for any New Code Change based on the Historical Data Daemon", An IP.com Prior Art Database Technical Disclosure, IP.com No. IPCOM000227396D, IP.com Electronic Publication: May 6, 2013, © & TM 2013 Symatec Corporation, All rights reserved, <http://ip.com/IPCOM/000227396>, pp. 1-7.

"A method to evaluate the risk of source code changes", An IP.com Prior Art Database Technical Disclosure, Authors et. al.: IBM, Original Publication Date: Mar. 19, 2009, IP.com No. IPCOM000180854D, IP.com Electronic Publication: Mar. 19, 2009, <http://ip.com/IPCOM/000180854>, pp. 1-7.

"Method and System to Predict Software Change Risk", An IP.com Prior Art Database Technical Disclosure, Authors et. al.: Disclosed Anonymously, IP.com No. IPCOM000208877D, IP.com Electronic Publication: Jul. 21, 2011, <http://ip.com/IPCOM/000208877>, pp. 1-3.

"A system to suggest regression test cases based on indirect change set and component references", An IP.com Prior Art Database Technical Disclosure, Authors et. al.: Disclosed Anonymously, IP.com No. IPCOM000227936D, IP.com Electronic Publication: May 29, 2013, <http://ip.com/IPCOM/000227936>, pp. 1-5.

Bantupalli, Sairam, "Regression Alerts", U.S. Appl. No. 14/296,485, filed Jun. 5, 2014, 24 pages.

IBM Appendix P, list of patents or patent applications treated as related, Feb. 16, 2016, 2 pages.

\* cited by examiner

REGRESSION ALERTS

FIELD OF THE INVENTION

The invention relates generally to the field of computer software development and more specifically to alerting users of potential regressions in the software.

BACKGROUND

The development and updating of software programs typically involves multiple iterations of a number of sections of code. As a program develops and undergoes changes, sections of code are often modified by several developers multiple times. A program called the source control system maintains a repository, where the most current versions of the program are stored. A developer may "check out" a copy, called a working copy, and make alterations to the code. The developer must then merge the working copy with the repository copy in order to update the software. Additionally, multiple developers may be working on the same file at the same time. This leads to multiple versions of a given file, each with different changes which may be incompatible with other developers' changes.

As the software changes, the developers must ensure that their modifications to the program have not resulted in the introduction of new software bugs, called regressions, to previously functioning software. Because of the high demands of consumers, minimizing regressions through multiple iterations of a software program can be an expensive part of software development.

SUMMARY

Embodiments of the present invention include a method, computer program product, and system for generating an alert as to a potential regression. In one embodiment, a server computer system receives an instruction from a first location to associate a first changeset with a record, wherein the first changeset has associated metadata. The server computer system associates the first changeset with the first record. The server computer system receives an instruction from a second location to modify the first changeset by merging a second changeset with the first changeset. The server computing system sends an alert to the second location to indicate that merging the first and second changesets may cause a regression.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a developer's computer, partly on the developer's computer, as a stand-alone software package, partly on the developer's computer and partly on a remote computer or entirely on the remote computer or server. In the latter scenario, the remote computer may be connected to the developer's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer, or other programmable apparatus, provide processes for implementing the functions/acts specified in the flowchart and/or block diagram block or blocks.

Figure 1:
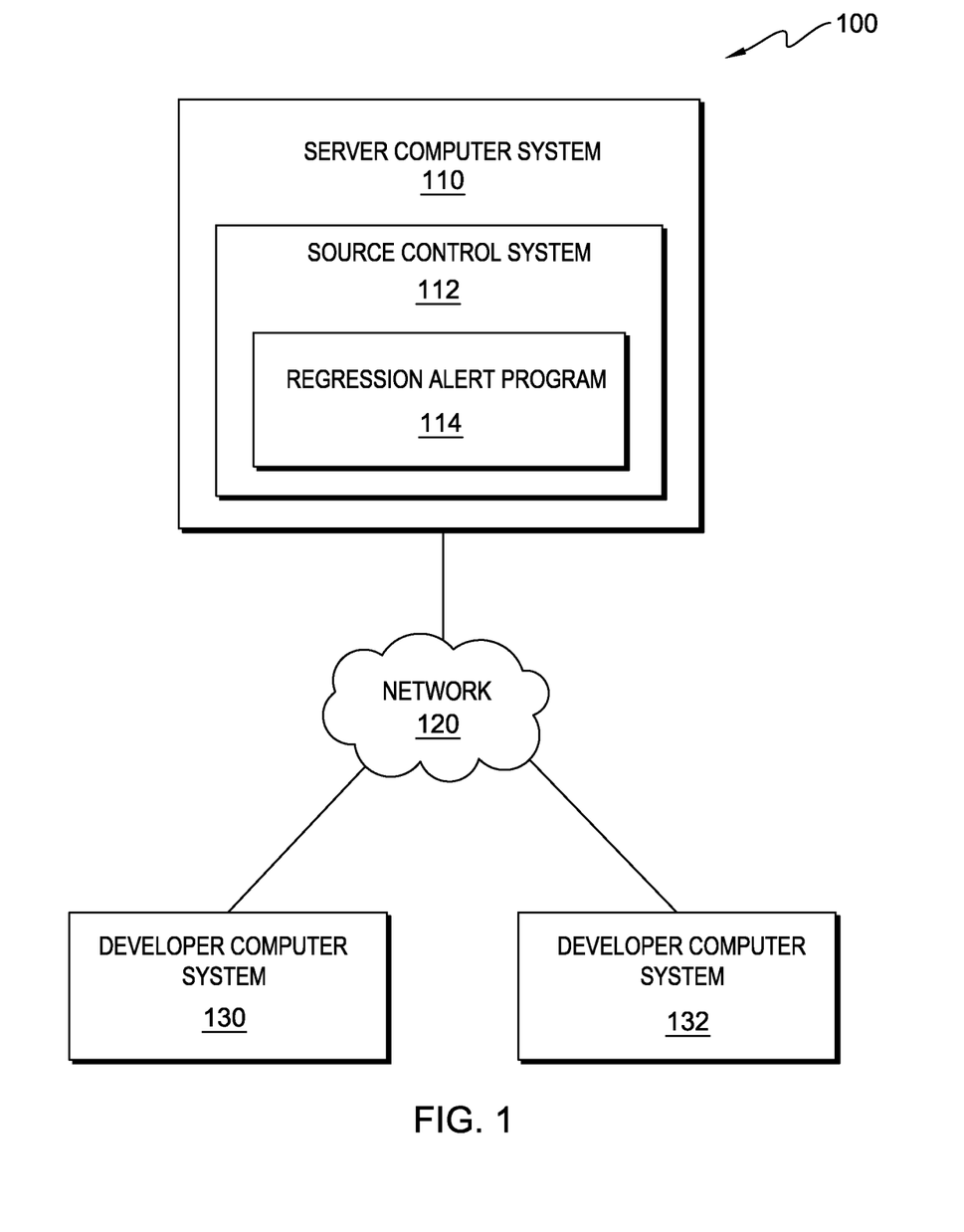
FIG. 1 is a functional block diagram depicting a software configuration management environment, in accordance with an embodiment of the present invention.

The invention will now be described in detail with reference to the Figures. FIG. 1 is a functional block diagram depicting a software configuration management environment, generally designated 100, in accordance with an embodiment of the present invention. Software configuration management environment 100 consists of a number of computer systems being connected through network 120. Software configuration management environment 100 includes server computer system 110, developer computer system 130, and developer computer system 132.

Server computer system 110 may be a specialized computer server, a desktop computer, a laptop computer, a tablet computer, a netbook computer, a personal computer (PC), or any other computer system known in the art. In certain embodiments, server computer system 110 represents a computer system utilizing clustered computers and components that act as a single pool of seamless resources when accessed through network 120, as is common in data centers with cloud computing applications. In general, server computer system 110 is representative of any programmable electronic device or combination of programmable electronic devices capable of reading machine readable program instructions and communicating with other computing devices via network 120. Exemplary components of a server computer system 110 are described in greater detail with regard to FIG. 4.

In various embodiments of the present invention, developer computer systems 130 and 132 can each respectively be a laptop computer, a tablet computer, a netbook computer, a personal computer (PC), a desktop computer, a personal digital assistant (PDA), a smartphone, or a programmable electronic device capable of communicating with server computer system 110 via network 120. In certain embodiments, developer computer systems 130 and 132 can each represent a computer system utilizing clustered computers and components that act as a single pool of seamless resources when accessed through network 120, as is common in data centers with cloud computing applications.

In general, network 120 can be any combination of connections and protocols that will support communications between server computer system 110 and developer computer systems 130 and 132. Network 120 can include, for example, a local area network (LAN), a wide area network (WAN) such as Internet, a cellular network, or any combination of the preceding, and can further include wired, wireless, and/or fiber optic connections.

Source control system 112 resides on server computer system 110 and manages changes to documents, computer programs, websites, and other collections of information. Source control system 112 may be a stand alone application or an application embedded in various types of software. Source control system 112 maintains a record and copy of each version of the document or computer program being edited in a central location called a repository. Source control system 112 holds a current copy of the document while multiple working copies are being altered by developers in order to ensure that previous versions of software are kept while future versions are being developed. In an alternative embodiment, source control system 112 may be included on developer computer systems 130 and 132.

Source control system 112 includes regression alert program 114 in an embodiment of the present invention. Regression alert program 114 allows developers to associate a record, such as a text, with a particular changeset. A changeset is an atomic collection of changes to files in a repository. It contains all recorded differences between the working copy and the parent file in the repository. A changeset also has associated metadata. This metadata may include, for example, the node id (i.e. the identifying information of the parent file), the list of change files, and the information about who made the changes, why, and when. A record is an additional piece of information, for example in the form of a text, that regression alert program 114 associates with the changeset. The record may, for example, become part of the metadata associated with the changeset. Once a changeset has a record associated with it, regression alert program 114 can search past changesets for those that are conflicting and have such records associated with them. A list of these changesets can then be generated for the developer to review and ensure that a current changeset does not conflict with past changesets in a way that will generate regressions.

Server computer system 110 includes source control system 112. Source control system 112 includes regression alert program 114. Source control system 112 maintains the repository, which stores past versions of a document currently being edited by developers. Developers access the repository on server computer system 110 using developer computer systems 130 and 132 via network 120. Developers can check out repository copies via network 120, make changes to those copies, and then merge the changed copies with the repository copy via network 120. Regression alert program 114 provides a mechanism for ensuring that merging the changed copies does not disrupt the functionality of unaltered portions of the repository copy.

Figure 2:
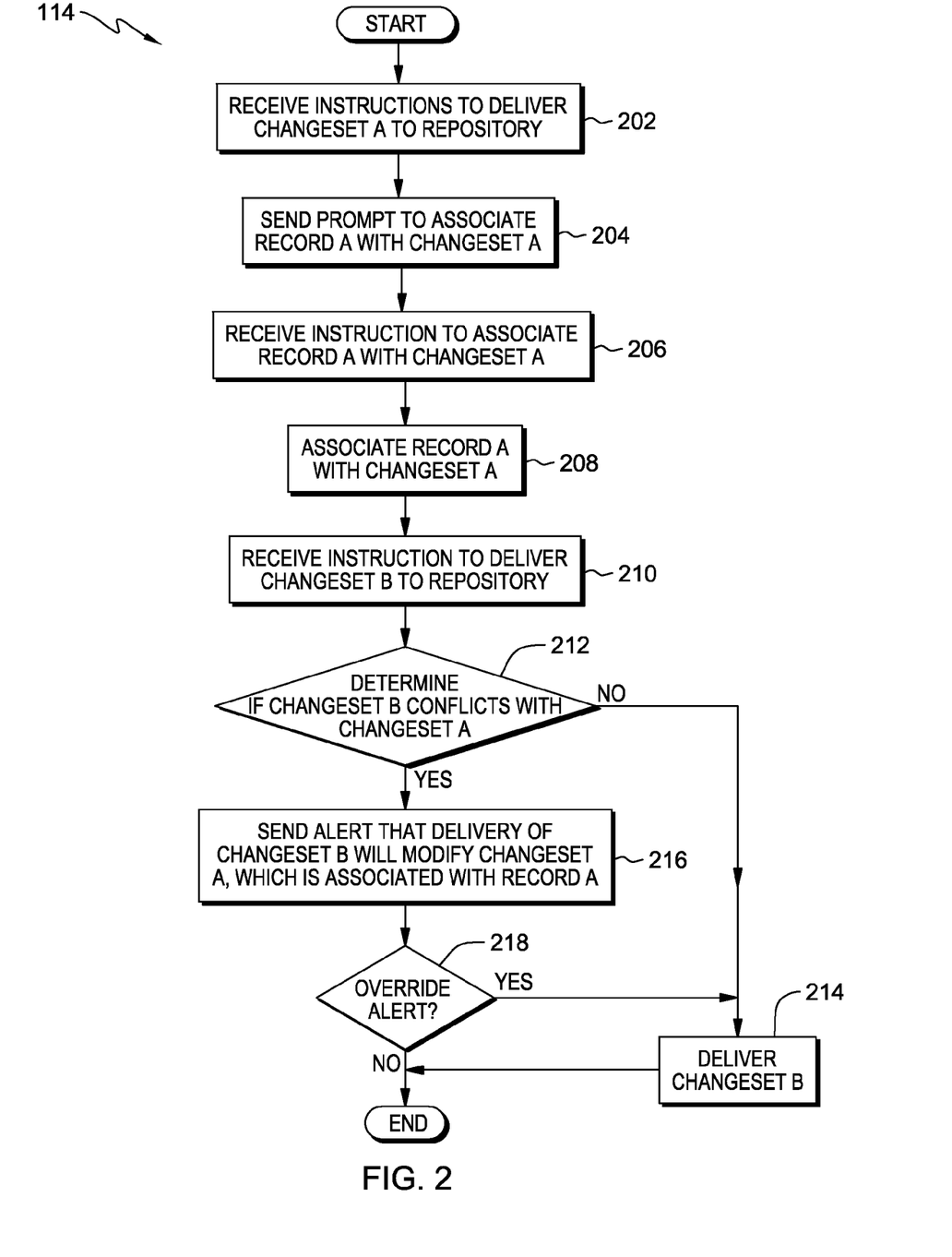
FIG. 2 is a flowchart depicting operational steps of a regression alert program, in accordance with an embodiment of the present invention.

FIG. 2 is a flowchart depicting operational steps of regression alert program 114 in accordance with an embodiment of the present invention. Regression alert program 114, which may be incorporated into source system 112, receives an instruction from a developer to deliver a changeset A to the repository (step 202). The repository is the central database where all versions of the software being developed are stored. When a developer checks a file out of the repository and makes changes, he must commit or merge those changes into the repository copy. These changes are embodied in the changeset. For example, a developer working on a software upgrade may check out a particular file associated with that software for updating. The developer can alter the checked out copy of the file. In order to preserve the changes in the repository, the developer must then commit the changeset representing those changes with the repository.

Regression alert program 114 sends a prompt to the developer to associate a record with changeset A (step 204). When a developer attempts to, for example, merge a changeset to a file in the repository, regression alert program 114 will provide that developer with an option to associate the changeset with a record. The record may be, for example, a string of text stored in the metadata of the changeset. The record may contain, for example, a list of the changes included in the change or a particular test case that must be verified in order to avoid future regressions in the file. Test cases are common tools used in regression control to ensure that a particular function of the file is working properly. A large database of test cases is commonly maintained for a given piece of software, which is often called a test suite. Test suites can contain a large number of test cases making constant verification of the entire test suite with each software upgrade both time consuming and expensive. In another embodiment, the record can contain a complete use case that the file must be able to complete in order to ensure that it is functioning properly. A use case is a list of steps that define interactions between an actor and a system to achieve a goal. For example, the actor can be a human user and the system is the program file.

Regression alert program 114 receives an instruction from a developer to associate record A with changeset A (step 206). The developer may choose to enter a record associated with the changeset currently being committed to the repository. Regression alert program 114 associates record A with changeset A (step 208). This association links the record with the changeset so that the record alerts any subsequent developer who attempts to enter a new set of changes which modifies changeset A. For example, when a subsequent developer attempts to commit a new changeset which affects the file with which the record is associated, the subsequent developer will receive a notification that the new changeset may cause a regression in the file.

Regression alert program 114 receives an instruction from a subsequent developer to deliver changeset B to the repository (step 210). Because software, for example, typically goes through multiple versions and iterations, both before and after release, many developers may work on individual sections of the program. When multiple developers are working on a single file or piece of software code, each one may remain ignorant of the changes made by the other developers. Therefore, when each developer attempts to merge or commit his or her changes, those changes may not function properly when merged with the changes of other developers. Regression alert program 114 receives the subsequent changesets, changeset B in the embodiment depicted in FIG. 2, after receiving changeset A and attempts to merge them together to create a new version of the repository file.

Regression alert program 114 determines if the changeset B may conflict, i.e. generate a regression, with a previous changeset that has a record associated with it, such as changeset A (decision block 212). Regression alert program 114 runs a search of, for example, the metadata of previous changesets that may have records associated with them conveying information regarding the changeset. If no potential conflicts exist (decision block 212, no branch), then regression alert program delivers changeset B to the repository in step 214.

If regression alert program 114 determines that there is a potential conflict between changeset B and changeset A (decision block 212, yes branch), by, for example, locating previous changesets which modify the same file and have records associated with them, then regression alert program 114 sends an alert to the developer of changeset B that delivering changeset B will modify changeset A, which is associated with record A, in step 216.

Regression alert program 114 then determines, based on developer input, such as a pop-up window with an option to override the alert, whether to override the alert (decision block 218). If the developer chooses to override the alert (decision block 218, yes branch), then regression alert program delivers changeset B to the repository, in step 214. If the developer chooses not to override the alert (decision block 218, no branch), then regression alert program 114 does not deliver changeset B to the repository and regression alert program ends operation.

Figure 3:
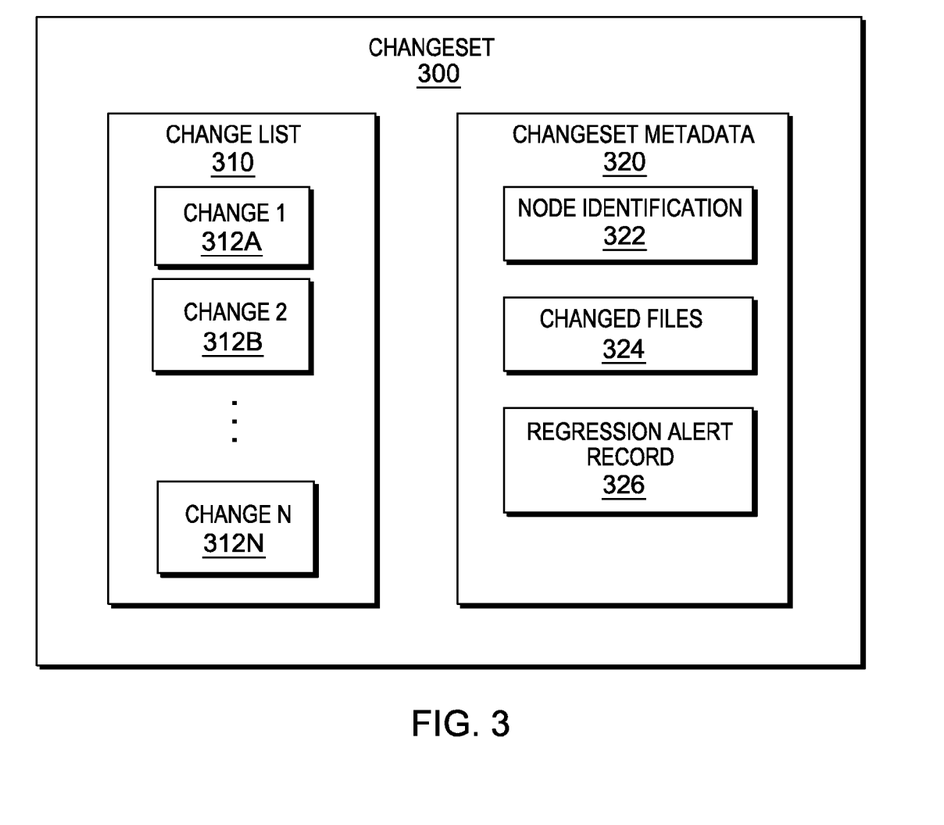
FIG. 3 is a block diagram depicting a changeset file, including associated metadata, in accordance with an embodiment of the present invention.

FIG. 3 is a block diagram depicting a changeset file 300, in accordance with an embodiment of the present invention. Changeset file 300 is a sample changeset, such as changeset A in the illustrative embodiment described above. Changeset file 300 includes change list 310. Change list 310 is a complete record of all of the changes included in the changeset to be made to the repository copy. Change list 310 includes a number of changes including change 1 312A, change 2 312B to change N 312N (hereinafter changes 312). Changes 312 can represent any changes between the repository file and the working copy prepared for merging, such as code alterations, addition of files, or removal of files from the repository copy.

Changeset file 300 includes changeset metadata 320. Changeset metadata 320 includes information associated by the user with the change list for future reference. For example, changeset metadata 320 includes node identification 322, a list of changed files 324, and regression alert record 326. Regression alert record 326 can be, for example, a list of test cases that must be run in order to verify that changeset file 300 does not have a regression as a result of subsequent changes.

Figure 4:
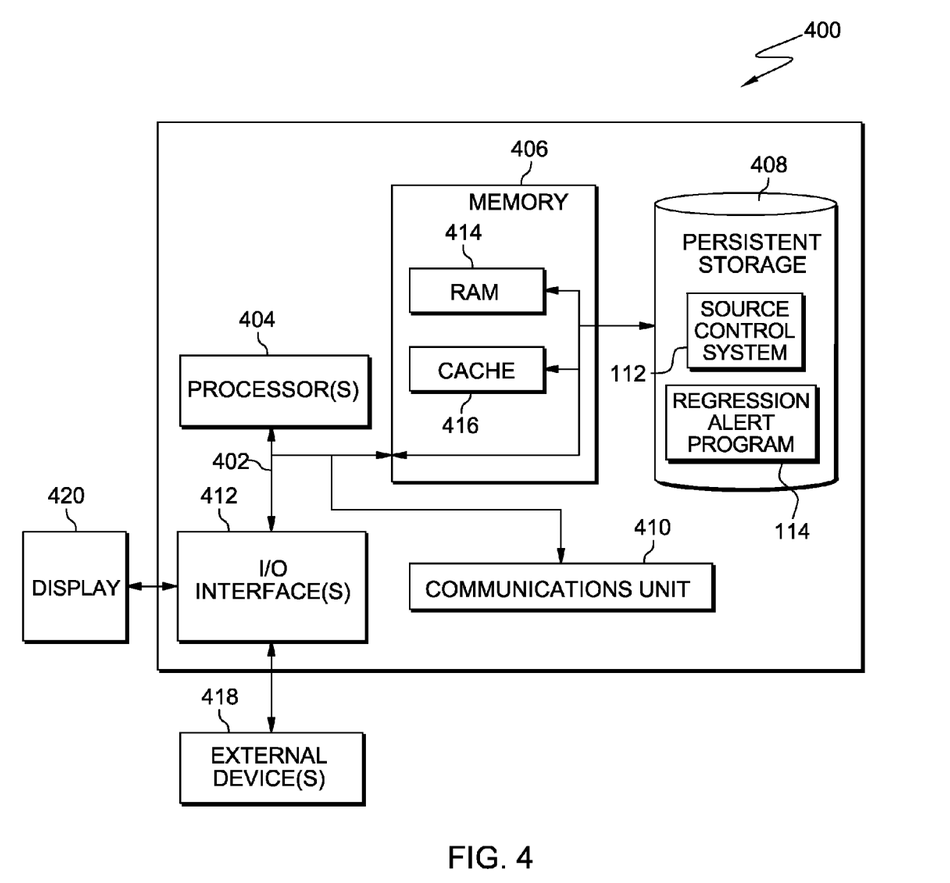
FIG. 4 depicts a block diagram of internal and external components of the server computer system executing the regression alert program in the software configuration management environment of FIG. 1, in accordance with an embodiment of the present invention.

FIG. 4 depicts a block diagram of respective internal and external components of server computer system 110 and developer computer systems 130 and 132, generally designated 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer system 110 and developer computer systems 130 and 132 include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Source control system 112 and regression alert program 114 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including server computer system 110 and developer computer systems 130 and 132. In these examples, communications unit 410 includes one or more network interface cards. Communications unit 410 may provide communications through the use of either or both physical and wireless communications links. Source control system 112 and regression alert program 114 may be downloaded to persistent storage 408 through communications unit 410.

I/O interface(s) 412 allows for input and output of data with other devices that may be connected to server computer system 110. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., source control system 112 and regression alert program 114, can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product embodied in one or more non-transitory computer-readable storage media for alerting a developer to a potential regression, the computer program product comprising:

program instructions to receive, by one or more computer processors, an instruction from a first location to associate a first changeset with a regression alert record, wherein the regression alert record is stored in metadata of the first changeset, and wherein the regression alert record comprises regression-avoidance guidance authored by a first user at the first location for reference by a second user at a second location when attempting to modify the first changeset;

program instructions to receive, by one or more computer processors, an instruction from the second user at the second location to modify the first changeset by merging a second changeset with the first changeset;

program instructions to determine, by one or more computer processors, responsive to receiving the instruction to merge, based on searching for changesets with associated regression alert records, that a regression alert record is associated with the first changeset;

program instructions to send, by one or more computer processors, an alert to the second user at the second location to indicate that merging the first and second changesets may cause a regression, wherein the alert displays information concerning the existence of the regression alert record and provides options to override the alert or take preventative action based on the guidance authored by the first user at the first location;

program instructions to receive, by one or more computer processors, an instruction from the second user at the second location to deliver the second changeset to a repository, wherein the instruction is based on an override of the alert or confirmation that preventative action has been taken; and program instructions to deliver, by one or more computer processors, responsive to receiving the instruction based on overriding the alert or confirming that preventative action has been taken, the second changeset to a repository.

2. The computer program product of claim 1, wherein the regression alert record comprises text stored in the metadata of the changeset.

3. The computer program product of claim 1, wherein the alert generates a list of changesets with associated regression alert records discovered by the search.

4. The computer program product of claim 1, wherein options to override the alert or take preventative action based on the guidance authored by the first user at the first location comprise an option to verify one or more test cases included in the regression alert record and clear the alert by confirming that the one or more test cases have been verified.

5. The computer program product of claim 1, wherein options to override the alert or take preventative action based on the guidance authored by the first user at the first location comprise an option to verify a use case included in the regression alert record.

6. A computer system for alerting a developer to a potential regression, the computer system comprising:
one or more computer processors;
one or more non-transitory computer-readable storage media; and
program instructions stored on the non-transitory computer-readable storage media for execution by at least one of the one or more processors, the program instructions comprising:
program instructions to receive, by one or more computer processors, an instruction from a first location to associate a first changeset with a regression alert record, wherein the regression alert record is stored in metadata of the first changeset, and wherein the regression alert record comprises regression-avoidance guidance authored by a first user at the first location for reference by a second user at a second location when attempting to modify the first changeset;
program instructions to receive, by one or more computer processors, an instruction from the second user at the second location to modify the first changeset by merging a second changeset with the first changeset;
program instructions to determine, by one or more computer processors, responsive to receiving the instruction to merge, based on searching for changesets with associated regression alert records, that a regression alert record is associated with the first changeset;
program instructions to send, by one or more computer processors, based on determining that a regression alert record is associated with the first changeset, an alert to the second user at the second location to indicate that merging the first and second changesets may cause a regression, wherein the alert displays information concerning the existence of the regression alert record and provides options to override the alert or take preventative action based on the guidance authored by the first user at the first location;
program instructions to receive, by one or more computer processors, an instruction from the second user at the second location to deliver the second changeset to a repository, wherein the instruction is based on an override of the alert or confirmation that preventative action has been taken; and
program instructions to deliver, by one or more computer processors, responsive to receiving the instruction based on overriding the alert or confirming that preventative action has been taken, the second changeset to a repository.

7. The computer system of claim 6, wherein the record comprises text stored in the metadata of the changeset.

8. The computer system of claim 6, wherein the alert generates a list of changesets with associated regression alert records based on the search.

9. The computer system of claim 6, wherein options to override the alert or take preventative action based on the guidance authored by the first user at the first location comprise an option to verify one or more test cases included in the regression alert record and clear the alert by confirming that the one or more test cases have been verified.

10. The computer system of claim 6, wherein options to override the alert or take preventative action based on the guidance authored by the first user at the first location comprise an option to verify a use case included in the regression alert record.

* * * * *